US008856658B2

(12) United States Patent  (10) Patent No.: US 8,856,658 B2
Brosh et al.  (45) Date of Patent: Oct. 7, 2014

(54) REPRESENTING USER INTERACTIONS AS A SYNCHRONOUS ACTION IN A BUSINESS PROCESS FLOW

(75) Inventors: Eyal Brosh, Herzliya (IL); Jacob Hecht, Kfar-Hess (IL); Boris Kronrod, Netanya (IL)

(73) Assignee: Flash Networks Ltd., Herzliya (IL)

( * ) Notice: Subject to any disclaimer, the term of this patent is extended or adjusted under 35 U.S.C. 154(b) by 1631 days.

(21) Appl. No.: 11/858,184

(22) Filed: Sep. 20, 2007

(65) Prior Publication Data

US 2009/0083632 A1  Mar. 26, 2009

(51) Int. Cl.
*G06F 3/00* (2006.01)
*G06F 3/14* (2006.01)
*G06Q 10/10* (2012.01)

(52) U.S. Cl.
CPC .................................. *G06Q 10/10* (2013.01)
USPC ........................... 715/738; 715/733; 715/764

(58) Field of Classification Search
None
See application file for complete search history.

(56) References Cited

U.S. PATENT DOCUMENTS

| 7,246,319 B2* | 7/2007 | Alden et al. ................... 715/738 |
| 2006/0039401 A1* | 2/2006 | Shenfield et al. .............. 370/462 |
| 2007/0061695 A1* | 3/2007 | Sanabria et al. ........... 715/501.1 |

* cited by examiner

*Primary Examiner* — Lewis A Bullock, Jr.
*Assistant Examiner* — Mark Gooray
(74) *Attorney, Agent, or Firm* — Fleit Gibbons, Gutman Bongini & Bianco PL; Martin Fleit; Paul D. Bianco

(57) ABSTRACT

Method and system for generating user interactions in a flow-based engine during the execution of a synchronous flow which potentially represent the logic for handling another user interaction. The method encapsulates and hides the asynchronous nature of the user interaction, thus enabling the author of the business flow to use the user interaction as a single synchronous action oblivious to the underlying asynchronous implementation, said method comprising of the steps: defining user interactions action in a business flow diagram as an atomic action; translating said flow into executable form; executing said flow, presenting said UI to end-user as a replacement to the original UI response for which the flow was invoked; receiving end-user response; resuming said flow and using said response in subsequent flow commands and continuing the original user interaction session.

7 Claims, 4 Drawing Sheets

REPRESENTING USER INTERACTIONS AS A SYNCHRONOUS ACTION IN A BUSINESS PROCESS FLOW

FIELD OF THE INVENTION

The present invention relates to flow-based software development or process or policy modeling environments, and more specifically, to representing of asynchronous user interactions as a single synchronous action in flow-based environments.

BACKGROUND OF THE INVENTION

In recent years, Business Process Management (BPM) engines have become increasingly common for the implementation of business logic rules within backend systems in a variety of domains. Such domains include, for instance, online vending machines such as content download servers, browsing servers such as portals and mobile portals, rating, charging and billing servers, Traditionally, business processes are implemented like any other programmed application, by using classical programming languages implemented by computer programmers. However, the nature of business processes is that they evolve and change frequently as the associated business requirements change and evolve. Therefore, engines that enable representing the business processes as flow charts, including a user-friendly graphical user interface (GUI) for authoring and editing these flow charts, have been introduced. Such systems produce an executable form of the flow drawn by the human writer and provide a runtime environment in which this executable form can execute.

A ubiquitous example of flow-based software development environment is business process execution language (BPEL) based systems. These systems enable authoring flows in a graphic environment. The flows are then compiled into a BPEL language and executed in a BPEL engine. Such systems enable encapsulating the business-logic of a business process, orchestration or application in a readily editable flow diagram which enables easier implementation by modelers or programmers and yields to rapid changes for addressing evolving requirements. This change also enables a common language between the business personnel who define the requirements and the technical personnel who implement them—since the flows are intuitive and descriptive, and has even enabled non programming personnel to implement and modify the programmed business flows as they become more intuitive and readily editable.

A key requirement in many cases is to allow human users to get involved in the business process, in at least one of the steps in the process flow. In order to accomplish this, the flow-based language should have the capability of presenting user-interaction (hereinafter: UI) dialogs and receiving the user-response. The user response is then used in the remainder of the flow for making decisions or for passing or storing information to external systems. In standard Business Process Management (BPM), BPEL and similar systems, user interaction is modeled as work items that are sent to users, for example via e-mail or other work list management GUI. Consequently, from the user point of view, the interaction is asynchronous.

Some user interactions are interleaved within a synchronous channel interaction that the human user already uses. For example, a download server receives a user-request for downloading a content item while browsing the service provider (mobile or web) portal. The server, according to the business process, must receive confirmation from the user for the charge. Hence the server may present the user with a dialog such as: "The item you have requested costs 50 cents—will you accept the charges? Yes/No"; the flow must then receive the user-response and, conditioned on that response, either deliver the item to the user or cancel the transaction.

In the aforementioned basic scenario, two actions must be executed in the underlying runtime implementation of the business logic. The first action is presenting a UI to the user and the second action is receiving a user input event. Most modern UI implementations with which users interact (not necessarily in relation to the process flow) are request-response type systems, in which the user-response is an asynchronous event which is unrelated to the UI presentation event. The most obvious example being Web-based GUI's, in which the UI is presented to the user by sending a markup page to the user-agent, and the subsequent response is received as a seemingly unrelated HTTP event received from the user-agent with a URL and parameters. Other current UI systems are also asynchronous in nature and posses the same request/response type process.

A further complication of the required underlying processing stems from two facts: first, the user interaction dialog does not necessarily include just a single page; e.g. in the above example, as part of accepting the charges, a user-authentication screen may be presented requesting the user to enter a PIN code to verify his/her identity.

The flow engine which implements the business-process related UI dialogs which intervene within the user's UI session may preferably not be the same server which implements the previous and subsequent UI's. E.g. in the above example, the advice of charge user-interaction may be generated and handled by the flow engine, while the preceding UI's that describe the vended items and the subsequent screens (or content response) which deliver the purchased item are handled by a download server—implemented on a separate server using a different technology.

The standard human interaction implemented in business process engines is asynchronous by nature and is task-oriented from the point of view of the user. In principle, it is possible for a business process management engines to provide intervening synchronous UI capabilities. However, the asynchronous nature of the underlying runtime events forces the flow writer to be aware of the various underlying events comprising the interaction. The flow writer must handle the correlation between the server response which is the user dialog presentation sent to the end-user, and the ensuing client request which is the user response to such UI.

In presently available flow-based software development environments, the implementation of the UI dialog as a pair of actions should be exposed to the UI management application developer. The responsibility for handling the correlation between the presented UI and subsequent response is on the UI developer. The UI developer must therefore obtain or generate a unique ID for the UI instance (the same UI can be presented to multiple users simultaneously) and for each response button within the UI screen or page—he or she must then encode this ID within the response for later correlation.

The abovementioned solution for dealing with asynchronous UI is cumbersome and error prone. It would be therefore advantageous to have a method and a system that represents asynchronous interactions into a single synchronous action, and providing an underlying implementation which supports this representation.

SUMMARY OF THE INVENTION

The present invention provides a method and system for generating user interactions in a flow-based process engine wherein the UI is presented to the user in an interaction channel which the user already has open. The method encapsulates and hides the asynchronous nature of the user interaction, thus enabling the author of the business flow to use the user interaction as a single synchronous action oblivious to the underlying asynchronous implementation, said method comprising of the steps: defining UI action in a business flow diagram as an atomic action; translating said flow into executable form; executing said flow, presenting said UI to end-user; receiving end-user response; resuming said flow and using said response in subsequent flow commands.

BRIEF DESCRIPTION OF DRAWINGS

The subject matter regarded as the invention will become more clearly understood in light of the ensuing description of embodiments herein, given by way of example and for purposes of illustrative discussion of the present invention only, with reference to the accompanying drawings (Figures, or simply "FIGS."), wherein.

Figure 1:
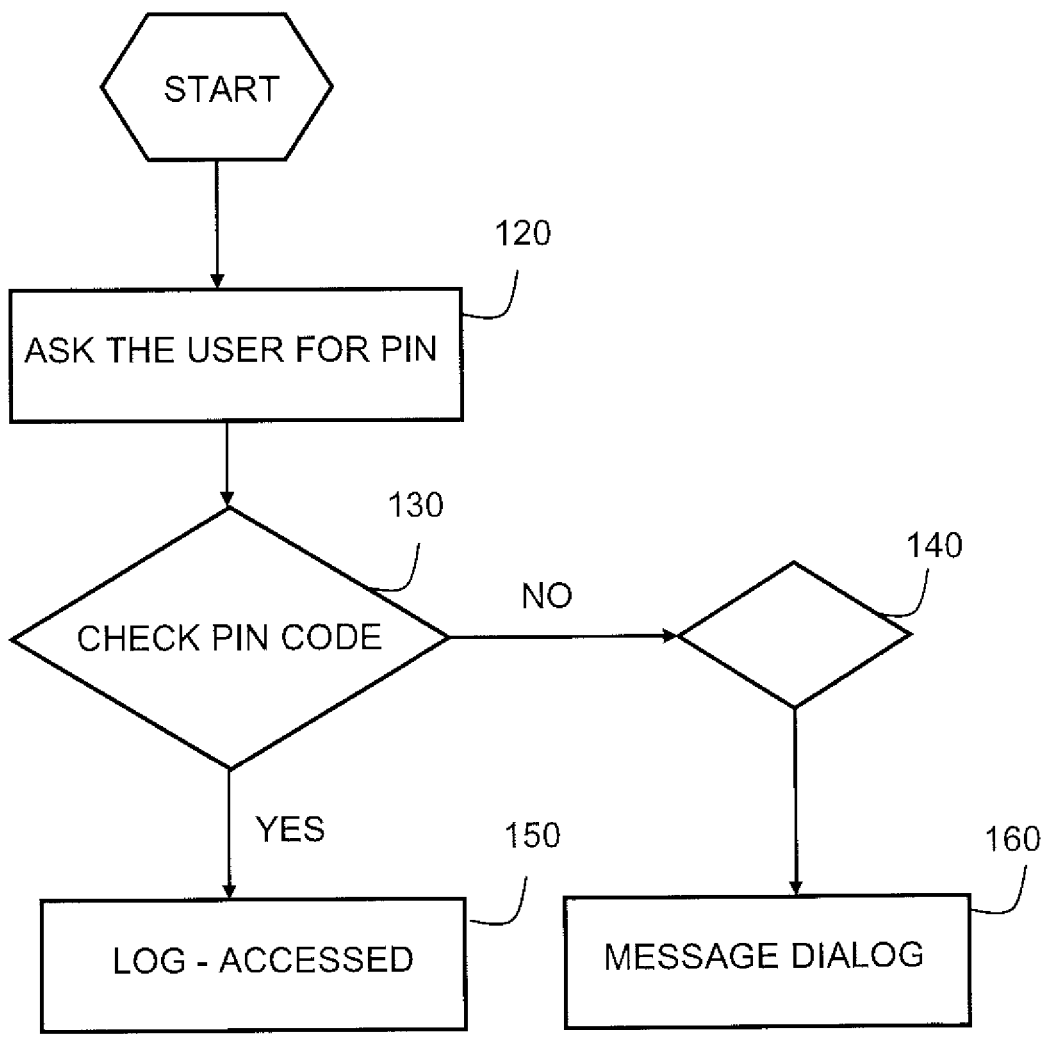
FIG. 1 is a representation of part of a flow diagram as written by the flow author.

The drawings together with the description make apparent to those skilled in the art how the invention may be embodied in practice.

Further, where considered appropriate, reference numerals may be repeated among the figures to indicate corresponding or analogous elements.

DETAILED DESCRIPTION OF THE INVENTION

FIG. 1 is a flowchart representing a possible flow as may be written by the flow author (writer). It shows two distinct UI actions: the first is: "Ask the user for PIN" 110 and the second is: "Message Dialog" 160. Each UI is represented as a single action in the flow and is thus exposing no complexities of the underlying implementations. The first UI action 120 is an interactive dialog in which the end-user is requested to enter an identification PIN (Personal Identification Number) code in order to proceed. A subsequent flow action 130 uses the result of this UI to decide on the course of action. The fact that between the first event 120 and the second event 130 an arbitrary number of asynchronous events have occurred is not apparent. In the case that the end-user has entered an incorrect PIN code, the right (NO) arm of the condition will be executed, and a new UI will be presented to the end-user 160 stating that the PIN was incorrectly entered.

Figure 2:
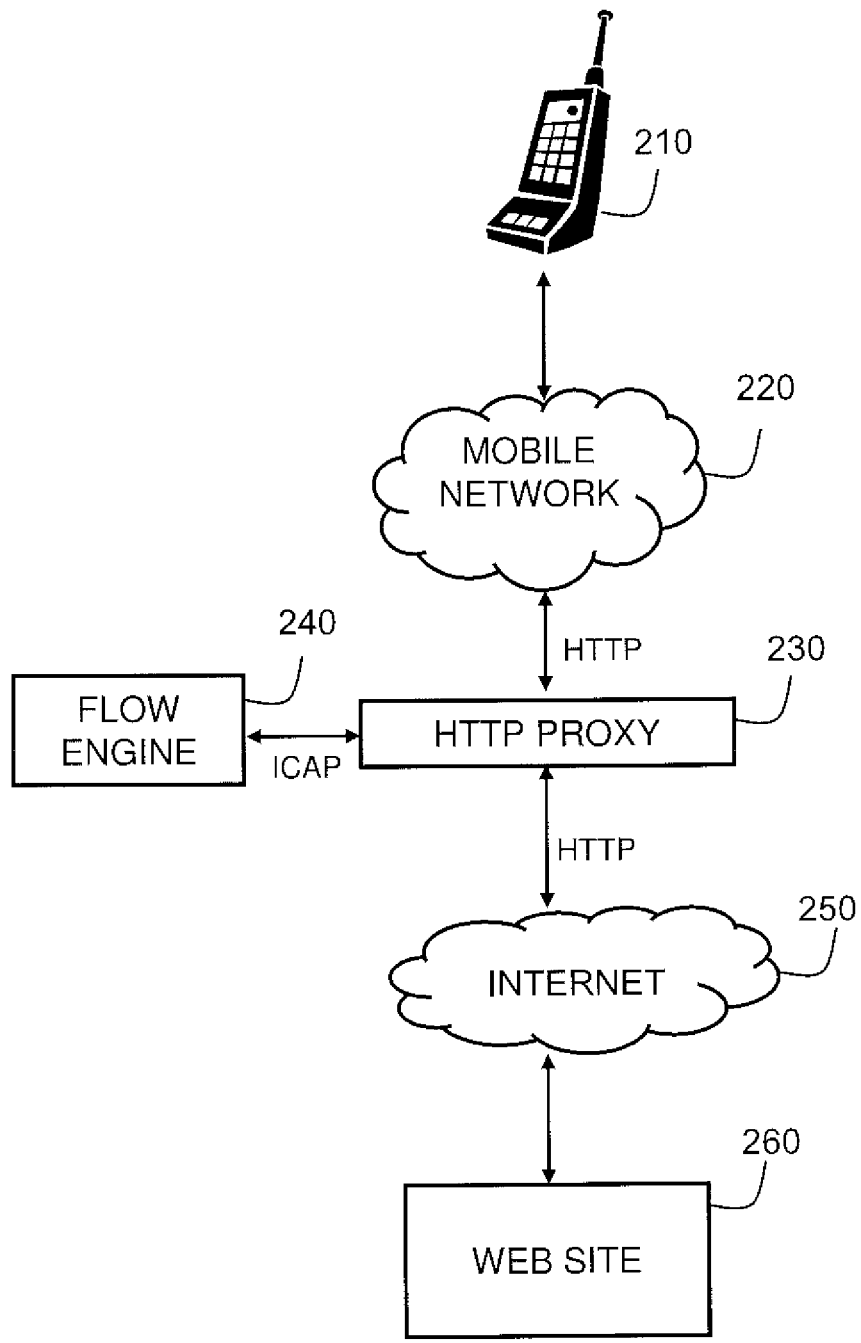
FIG. 2 is a block diagram of the environment in which the invention may be implemented in a Web-type application for mobile network.

FIG. 2 is a block diagram of the environment in which the invention may be practiced. This environment is a Web-type application for a mobile network.

A Web enabled mobile phone 210 accesses Web content 260 via the wireless network 220 (via the proxy 230 and the Internet 250). The Proxy 230 proxies the user-agent requests to the Web-site 260 via the Internet or Intranet. Before transferring the request to the Web content site, the proxy consults the Flow Engine 240 Denoted for invoking the policy flow. The Flow Engine 240 response to the Proxy may then be used to present the user-agent with UI dialog.

Invoking the flow engine from the proxy is exemplified here using ICAP (Internet Content Adaptation Protocol) based interface, which is a standard protocol for modifying requests and responses in HTTP based applications. Any protocol agreed between the interception point of the user request and the policy flow engine can be used.

Figure 3:
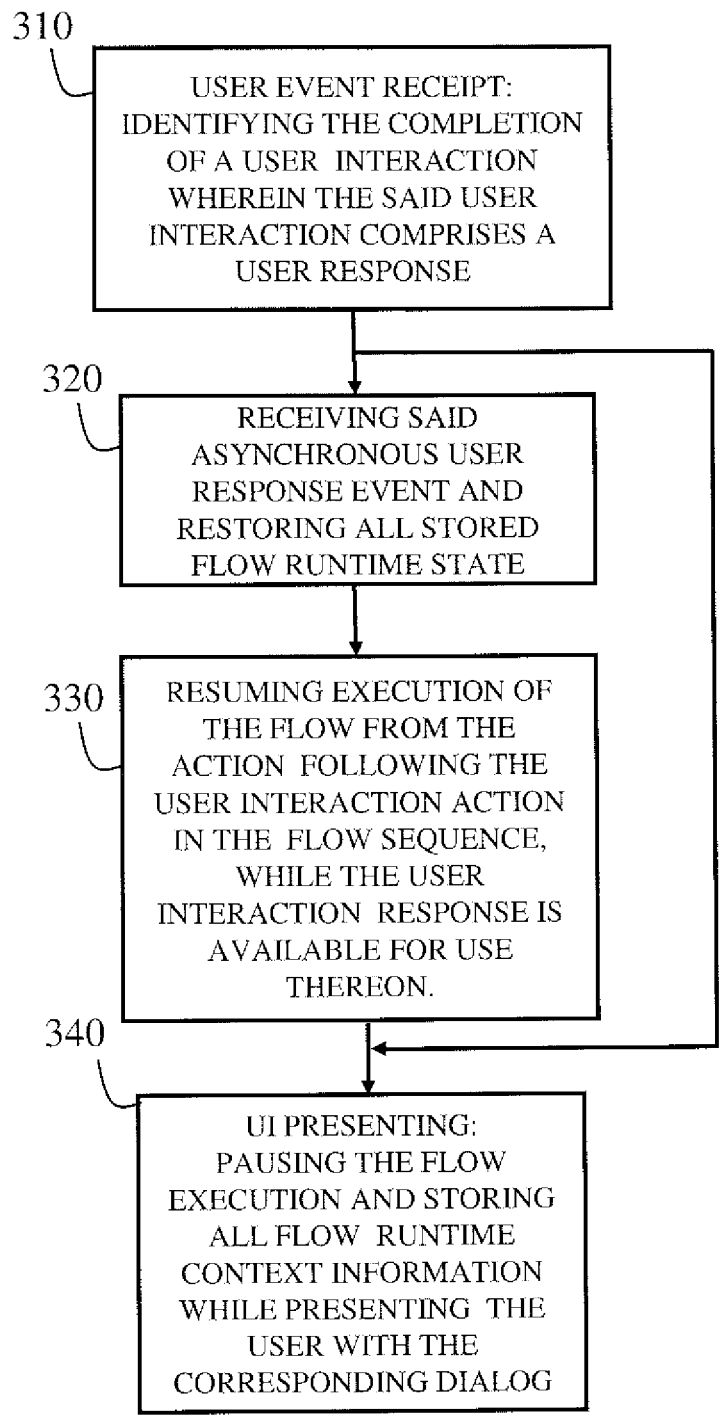
FIG. 3 is a flowchart describing the steps of the method according to the present invention.

FIG. 3 is a flowchart showing the steps of the method, performed at runtime, when an event that is potentially related to a previous user interaction is received: Upon receipt of an asynchronous event, as UI responses are received in asynchronous events and the event at hand may embody such a user response, the first step of processing is aimed at identifying the possible completion of a previously presented user interaction—310. The second action is conditional upon this event being a UI completion—receiving said asynchronous user response event and restoring all stored flow runtime state—320. In such case the following step is resuming execution of the original flow from the action following the user interaction action in the flow sequence, while the user interaction response is available for use thereon—330. When the flow executes, the flow may request to present a UI dialogue to the user, pausing the flow execution and storing all flow runtime context information while presenting the user with the corresponding dialog—340.

Figure 4:
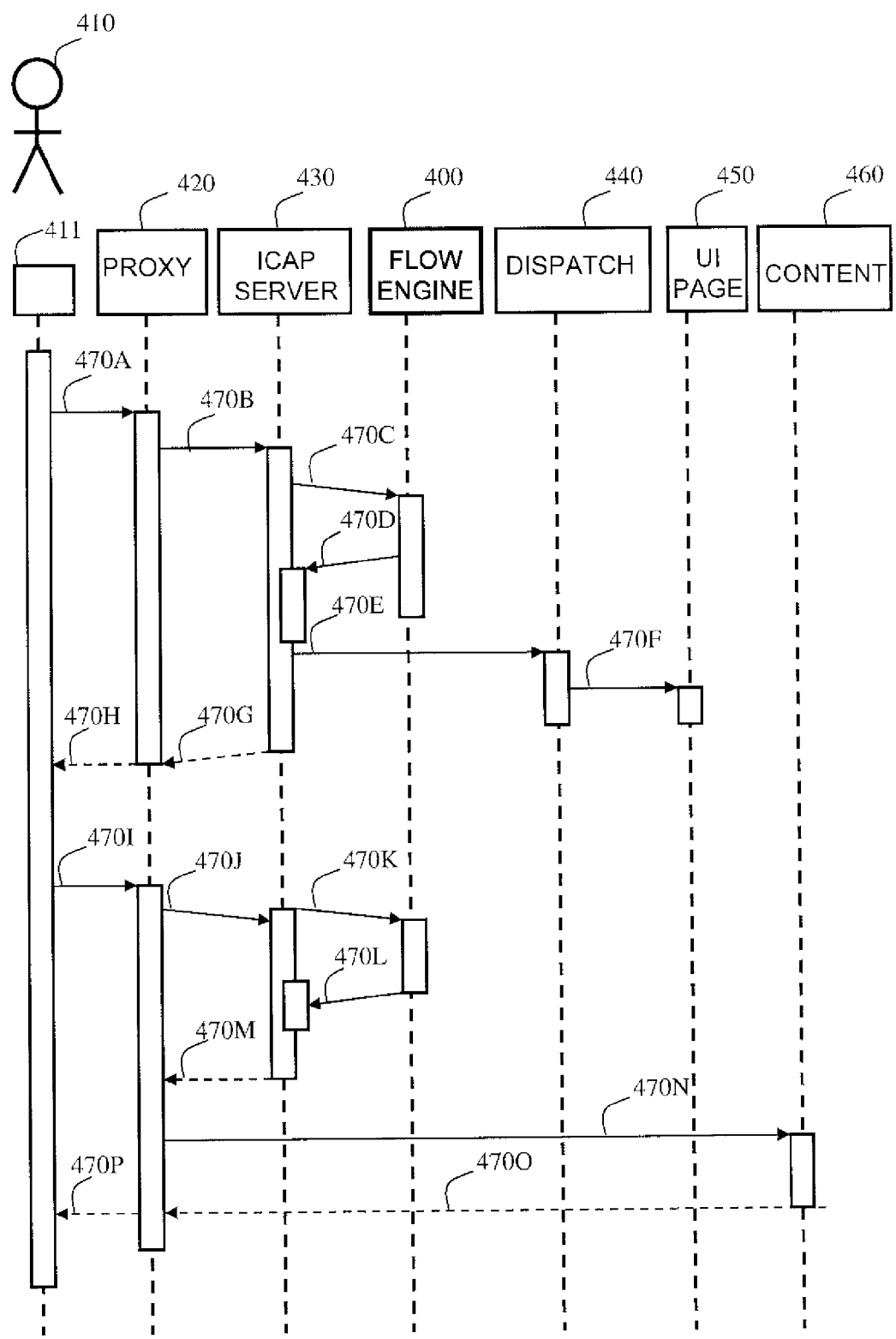
FIG. 4 is a unified model language (UML) sequence diagram describing in details an example for the sequence of events performed for a web based UI processing according to the present invention.

FIG. 4 is a UML sequence diagram depicting the sequence of events performed for a Web based UI processing. A User-Agent 410 issues a request 470A to target site (for example http://www.google.com). The Proxy 420 receives this request and invokes 470B the flow engine 400 e.g. via ICAP server 430 producing a request to the flow engine 470C. The flow engine 400 checks if the request is a "UI response" for some suspended flow, based on POST parameters and/or HTTP Headers. If it is not, the flow engine 400 starts a new flow instance for handling the user request, if it is, the old flow instance is resumed with full context.

In the case that the flow engine 400 decides to respond to this request with a Simple OK/Cancel dialog UI (i.e. the running flow reaches a UI dialog action), the whole flow instance is suspended and the flow engine 400 manufactures content markup page of the Dialog UI page, sending the request to the dispatcher 440 and the UI page 450 via a response to the ICAP server 470D, which issues a requests 470E and 470F accordingly. This may be implemented using any Web technology, (e.g., JSP). Parameters of this page may include, for example, text of the message, label for user, OK and Cancel buttons, ID of suspended flow and the OK/Cancel code—encoded within the OK and Cancel links' URLs, Icons or other graphical elements. The flow engine 400 sends this content back to Proxy 420, which returns 470H it to the end user 410, without going to the target site. The end user browser 411 presents the UI Page Assuming end user 410 presses OK button on received UI page. This request 4701 is received by the proxy 420 which again invokes 470J Flow engine 400 via the ICAP server 430 and an ICAP request 470K for handling the user's request. The flow engine 400 recognizes this request as a "resume" message for the suspended UI flow by inspecting request parameters (e.g., GET or POST) and retrieves exact flow to resume from said parameters. The flow engine 400 then resumes the suspended flow and passes the user response (OK/Cancel).

The flow logic continues, and assuming that flow allows the end user 410 to access the original site, the flow engine 400 restores the original HTTP request, including URL http://www.google.com and other attributes. Specifically, the flow engine 400 stores the whole request, including headers and parameters for both GET and POST methods. The flow engine 400 returns the proxy 420 the original request for issuing to a Web site. The proxy 420 issues a HTTP request to http://www.google.com. The proxy 420 then receives a response from the Website, which the proxy 420 sends back to the user agent 410.

The above mentioned process has been exemplified through a Web-based architecture. However, those skilled in the art will see that the same implementation applies to all UI methods that work over any other asynchronous events based environments. Implementation is proposed for User Interaction within HTTP, SIP, client server type interactive applications such as portals or download servers, Interactive applications over messaging protocols (SMS, MMS, WAP Push), and all other environments under which User Interaction is performed through underlying asynchronous events. Each implementation can use the appropriate proxy (SIP proxy, messaging gateway, etc.) or the application itself (e.g. Portal) as the UI enforcement point which invokes the Policy engine flow and substitutes the UI for the end user.

In this described implementation, the subsequent UI response event is handled by the policy server in a same manner as the original request for which the UI was presented. The flow itself is one that represents how to handle the previous user request (e.g. HTTP, SIP) so we actually have a UI within the flow handling of another browsing UI. This differs from UIs as asynchronous actions as is done in prior art BPM systems in which the response event to the UI action is an asynchronous event of a type used for resumption of suspended flows. This method allows for several advantages: The author of a new UI interaction method (e.g. SIP or SMS) is not required to be aware of the asynchronous events supported by the underlying flow engine.

This yields great advantages: Implementation is simple, as only one type of flow invocation is required to be known. Internals of the flow engine are not exposed even to the programmer. Uniformity and Portability: since the implementation of the UI interface in all domains is oblivious to the underlying engine's asynchronous event implementation, and likewise the flows, the system lends itself to migration and implementation of existing UI methods over a variety of underlying flow engine implementations once the interception methods have been implemented. The flow utilizing the synchronous UI action can be defined as a synchronous flow in the flow design tool. This is a unique advantage, as flows encompassing asynchronous events posses limitations in prior art BPM engines in which all events of such flow must asynchronous. The UI process viewed by the end-user can be arbitrarily complex: Once the UI is shown, the user-agent may respond with any number of requests that invoke different flows or that access content. The correct response will trigger the suspended flow, while other requests may trigger other flows, access content, and even produce parallel UI's in parallel flows.

It is possible for the user to break-out for his standard user interaction while a flow generating a UI dialog is open (i.e. waiting for the user's response). For example, this can be the result of clicking a link in the presented UI page that takes the user to another page, thus activating a new flow. In this case, multiple UIs may be open in parallel, waiting for multiple user responses concurrently while storing the context of each of the flows invoking the UI actions. When a user response is received, the proper UI dialog is matched and the context of the right flow is reconstructed.

Implementation of the aforementioned UI capabilities requires implementation of several features within and over the flow engine. Additional requirements of the implementation method result from the necessity of the process to support large amounts of requests with reasonable limited processing power and good response times. Hence the flow engine must be equipped with native features that facilitate such implementation.

To implement this invention, the flow engine should posses the capability of pausing a flow execution while maintaining all flow related context information such as local variables, session information, and flow execution location.

The pause must be efficient in time and memory and must release the associated server resources that are not required for the flow while not executing—such as execution thread of the underlying machine.

The pause must enable easily identifying the flow and its execution location within the flow and resuming the flow execution while maintaining all previously saved context and enabling to add response information received from UI action response.

The interaction method with the enforcement point at which the end-user accesses (the proxy in the above example), which introduces the UI's, should allow for substitution of the original user request with a modified request or directly introducing a response to the request.

The original user-request must be saved and restored intact and in highly efficient manner. For this the interception layer of the flow engine, which receives the user request in a protocol specific to the UI domain and proxy capabilities, and the flow execution environment which stores and restores context information, share unserialized request information. This information is stored by the flow engine as context information, and restored into the flow execution space intact. This method enables support for a multitude of underlying protocols, and enables solving the critical performance issue of transferring the request information to the flow domain, storing it, and restoring it for a large number of concurrent requests with acceptable performance. Prior art flow engines (such as current off-the-shelf BPEL engines) use serialization for their flow invocation methods, which requires unacceptable processing latencies and does not lend well to encoding any arbitrary underlying protocol format.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description below.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element.

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The term "method" may refer to manners, means, techniques and procedures for accomplishing a given task including, but not limited to, those manners, means, techniques and procedures either known to, or readily developed from known manners, means, techniques and procedures by practitioners of the art to which the invention belongs.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention can be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the embodiments. Those skilled in the art will envision other possible variations, modifications, and applications that are also within the scope of the invention. Accordingly, the scope of the invention should not be limited by what has thus far been described, but by the appended claims and their legal equivalents. Therefore, it is to be understood that alternatives, modifications, and variations of the present invention are to be construed as being within the scope and spirit of the appended claims.

What is claimed is:

1. A method of managing sessions between multiple computerized devices and multiple web contents through a communication network, the method is comprising the steps of: running or initiating multiple business flows related to a user;

receiving one or more asynchronous requests for content from a computerized device by one or more users by a proxy, wherein the content is stored on a web content;

checking whether the request is one of two flow types: (i) User Interaction (UI) for a previous suspended flow; and (ii) content request, by sending the request to a flow engine;

if the request is a user interaction, resume previous suspend flow;

if the request is a content request:

suspending each business flow after a request for content is received; storing a runtime state of each suspended business flow;

receiving requirements for providing the request to each one of the users;

interacting with each user by sending a UI page via a dispatcher including identification (ID) of the suspended flow, to the computerized device of each user, wherein another business flow is opened from the UI flow and another UI flow from the another business flow is opened, thus multiple business flows and multiple UI flows which are related to the same user are running concurrently at multiple web pages, each flow interacting with different server;

receiving a response from each one of the users by the proxy to each one of the multiple UI flows;

forwarding the response from each of the users related to the multiple UI flows to the flow engine;

recognizing each response as a UI response utilizing parameters in each response;

identifying the relevant suspended business flow from the multiple business flows which are running concurrently according to the ID appearing in the UI page;

resuming each suspended business flow of actions, of the multiple business flows, by the stored runtime state in the ID of the suspended flow; and sending each user the requested content from the web content.

2. The method according to claim 1, wherein the flow engine provides means to an interception layer for resuming each suspended business flow of actions.

3. The method according to claim 2, wherein said means for resuming each suspended business flow of actions are capable of storing any event type handled by an interception layer through raw storage of the event information, and sharing of memory between the interception layer and a flow context layer.

4. The method according to claim 2, wherein said means are capable of efficient transfer and storage of the event information through sharing of event information between the interception layer and a flow context layer.

5. The method according to claim 2, wherein said means are capable of storing any event type handled by the interception layer through raw storage of the event information, and sharing of memory between the interception layer and flow context layer.

6. The method according to claim 2, wherein said means are capable of efficient transfer and storage of the event information through sharing of event information between the interception layer and a flow context layer.

7. The method according to claim 2, wherein said means are capable of storing any event type handled by the interception layer through raw storage of the event information, and sharing of memory between the interception layer and flow context layer.

\* \* \* \* \*